Jan. 26, 1926.  1,570,795
U. C. TAINTON
STORAGE BIN OR HOPPER
Filed August 20, 1924  2 Sheets-Sheet 1

Inventor.
Urlyn C. Tainton.
By Dewey Strong
Townsend and Loftus
Attorneys.

Jan. 26, 1926. 1,570,795
U. C. TAINTON
STORAGE BIN OR HOPPER
Filed August 20, 1924 2 Sheets-Sheet 2

Inventor.
Urlyn C. Tainton.
By Dewey, Strong,
Townsend and Loftus
Attorneys.

Patented Jan. 26, 1926.

1,570,795

UNITED STATES PATENT OFFICE.

URLYN C. TAINTON, OF JOHANNESBURG, SOUTH AFRICA.

STORAGE BIN OR HOPPER.

Application filed August 20, 1924. Serial No. 733,123

*To all whom it may concern:*

Be it known that I, URLYN C. TAINTON, a British subject, residing at Johannesburg, Transvaal Province, Union of South Africa, have invented new and useful Improvements in Storage Bins or Hoppers, of which the following is a specification.

In many industrial or manufacturing operations it is necessary to withdraw a granular or powdered material from a storage receptacle, and feed it either continuously or intermittently to some other point. The usual method of accomplishing this result is to use a storage receptacle of the hopper type, i. e. having conical or sloping sides, and to place a mechanical feeder, such as a helical conveyor, moving apron, or rotating disc at the bottom of the restricted area of the container, so that the material will fall down to this point and be carried out by the feeder.

Difficulty is often encountered with this type of hopper or bin on account of the tendency of many finely-divided or slightly damp materials to stick to the sides of the container. Where, as in many cases, it is necessary to have a uniform feed of the material to some other point, this sticking or "holding up" of the material is very objectionable, and many devices, such as scrapers, moving chains, etc., have been proposed and employed in order to overcome this difficulty.

These devices, however, suffer from the defects of being often unreliable, relatively expensive, and rather apt to get out of order. In addition a special type of bin or hopper construction is usually required.

By means of the device here presented, these difficulties are obviated. The system is entirely reliable, simple, and can be adapted to any type of bin construction.

According to the present invention, the wall of the bin, preferably the conical or sloping wall, is covered with a sheet of some air-tight material, such as rubber or rubberized fabric. This sheet is attached all around its edges to the wall of the bin, said wall being made of, or covered with, a sheet of metal or other impermeable material.

Arrangements are made for introducing a small quantity of compressed air intermittently behind the fabric or rubber so that the latter is distended and the material lying thereon is pushed or lifted away from the wall. The pressure is thereupon released and the material then falls back again. The operation is repeated as desired, making it impossible for the material to adhere to the sides of the bin.

The arrangement is shown in the accompanying drawings, in which—

Figure 1:
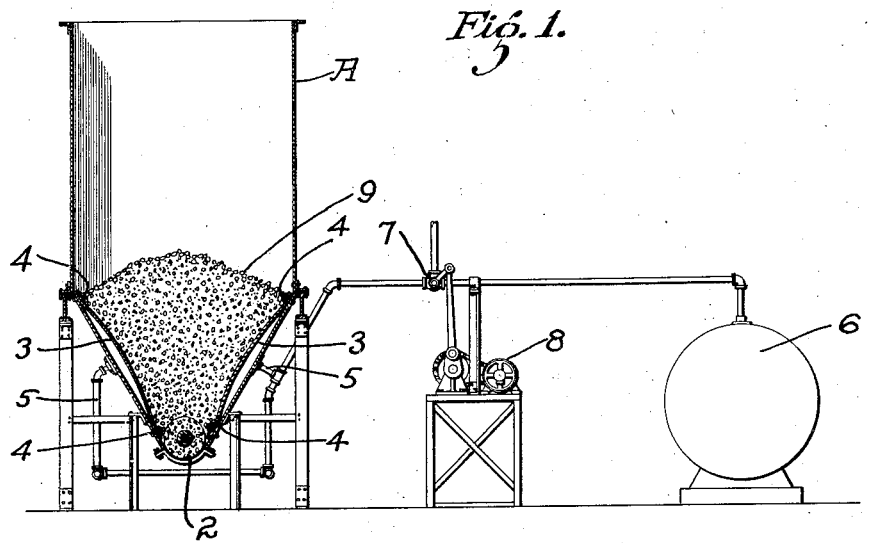
Fig. 1 is a central vertical section of a hopper showing the application of the invention.
Figure 2:
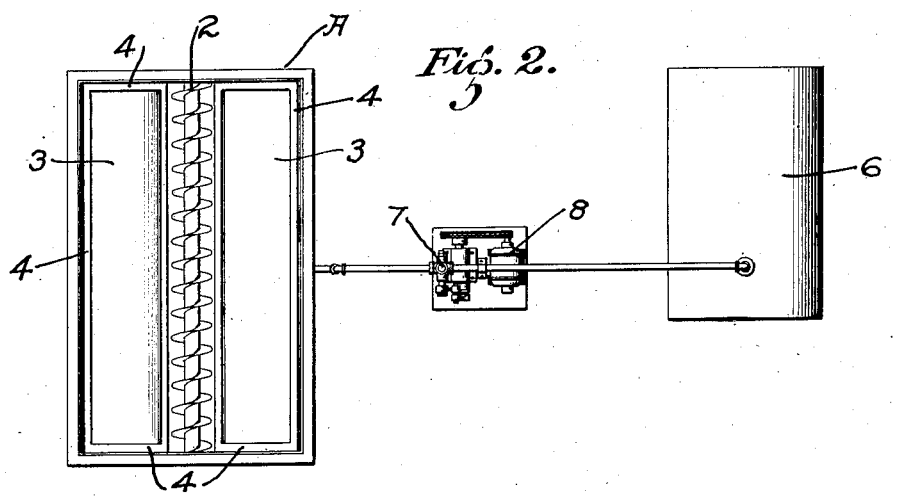
Fig. 2 is a plan view of the same.
Figure 3:
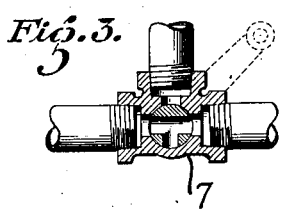
Figs. 3 and 4 are sectional views of the three-way valve employed, which controls the flow of air by which the flexible bottom sections are intermittently inflated and exhausted.

Referring to the drawings in detail, and particularly to Figs. 1, 2, 3 and 4, A indicates a hopper constructed of sheet metal or any other suitable material. This hopper is provided with a screw conveyor 2 disposed in the bottom thereof and passing through one wall. On the sloping walls of the hopper, rubber diaphragms 3 are placed and attached to the walls all around the edges by metal strips 4. Compressed air is led in behind these diaphragms by means of pipes 5, leading from a compressed air receiver 6 at suitable pressure. Between the source of air supply and the diaphragm, a three-way cock 7 is inserted in the pipe line, and this cock is actuated by suitable mechanism 8 so that compressed air is alternately blown in behind the diaphragms, and then allowed to exhaust. The pulverized material 9 lying against the diaphragms is thus positively prevented from adhering to the side of the bin, and feeds steadily down to the bottom as it is withdrawn. For the screw conveyor may be substituted any other appropriate device, such as a belt conveyor or rotating disc, etc.

Figure 4:
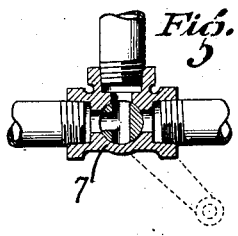
Figure 5:
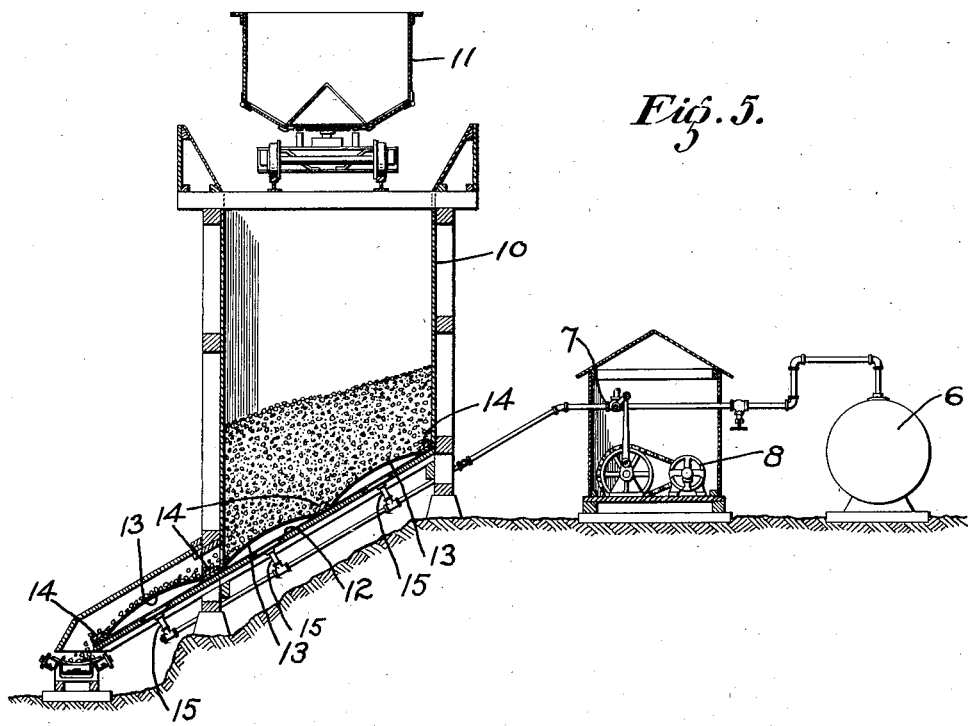
Fig. 5 is a central vertical section of a modified form of the hopper.
Figure 6:
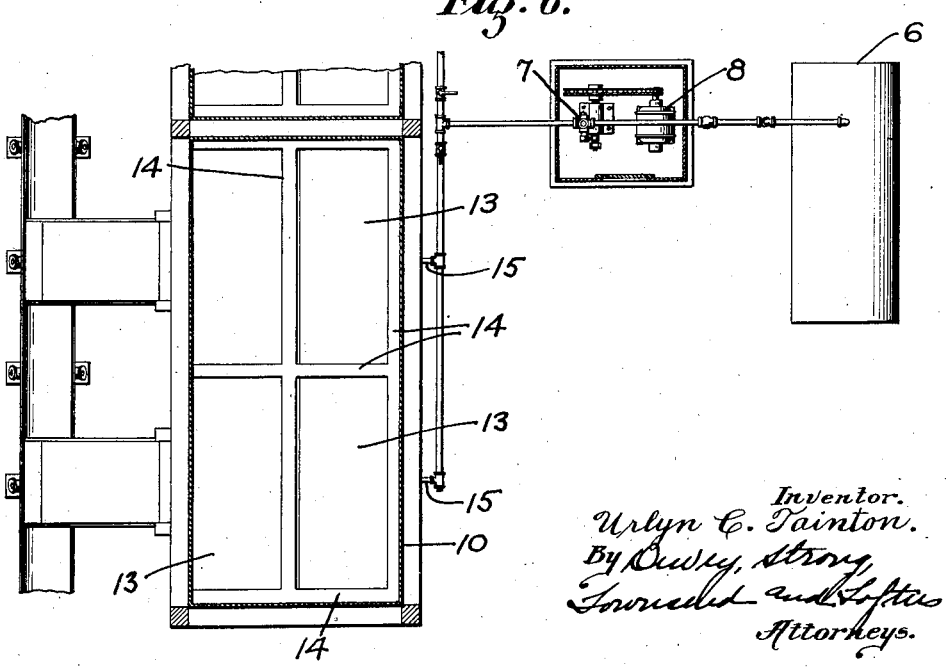
Fig. 6 is a plan view of the same.

An example of the application of the invention to another type of bin is shown in Figs. 4 and 5. Here 10 represents a bin of standard type having a track over the top of it so that railroad cars 11 can be dumped directly into it.

In order to adapt this type of bin to the present invention, a sheet of iron plate 12 is laid on the sloping bottom of the bin. This is in order to provide an air-tight backing for the diaphragm 13, which are attached to the plate by metal strips 14 in such a way as to produce a number of panels. At each of these panels an air line 15 is introduced, and this pipe is connected through a reciprocating three-way cock, to a source of compressed air as above described.

The pulverized material is dropped on top of the diaphragms. The pulsating movement of these, as the air is alternately admitted and released, results in a constant movement of the mass of material and positively prevents any chance of sticking or clogging.

This type of bin has proved very effective for the feeding of sticky or very finely divided materials, such as flour, sugar, slaked lime, damp concentrates, dried ore slimes, etc. It is clear that many modifications of the idea can be devised to meet various conditions, and I do not limit myself to the particular forms described. For example, the diaphragms may be protected in any desired manner, for instance with metal plates, or the diaphragms may themselves be made of flexible metal sheets. Again, the feeder at the base of the bin can sometimes be dispensed with, and the material allowed to flow through a regular opening, under the influence of the pulsating movement of the diaphragm.

Having thus described my invention, what I claim and desire to secure by Letters Patent is—

1. A method of inducing movement in a mass of granular or pulverulent material, which consists in depositing the material on a resilient support disposed on an incline, and imparting a relatively small movement to the resilient support in a direction away from the material.

2. A method of inducing movement in a mass of granular or pulverulent material, which consists in depositing the material on a resilient support disposed on an incline, and imparting a pulsating movement to the resilient support.

3. A method of inducing movement in a mass of granular or pulverulent material, which consists in depositing the material on a pneumatically inflatable resilient support disposed on an incline and intermittently inflating and deflating said support.

4. In a hopper of the character described, an inclined bottom section, a resilient member carried by the bottom section and forming a support for material deposited in the hopper, and means for imparting a pulsating movement to said resilient member.

5. In a hopper of the character described, an inclined bottom section, a resilient member carried by the bottom section and forming a support for material deposited in the hopper, and means for pneumatically imparting a pulsating movement to said member.

6. In a hopper of the character described, an inclined bottom section, an inflatable resilient member interposed between the bottom section and material contained in the hopper, and means for automatically and intermittently inflating and deflating said member.

7. In a hopper of the character described, a pair of opposed inclined bottom sections, the lower ends of said bottom sections being separated to form a discharge opening, a sheet of rubber for each bottom section, each sheet being secured along its outer edges to the bottom section to form pneumatic air chambers, a pipe connected with said air chambers, said pipe being connected with a source of air under pressure, and means for intermittently admitting and exhausting air from said chambers.

8. In a hopper of the character described, a pair of opposed inclined bottom sections, the lower ends of said bottom sections being separated to form a discharge opening, a sheet of rubber for each bottom section, each sheet being secured along its outer edges to the bottom section to form pneumatic air chambers, a pipe connected with said air chambers, said pipe being connected with a source of air under pressure, means for intermittently admitting and exhausting air from said chambers, and a conveyor disposed below the discharge opening of the hopper.

URLYN C. TAINTON.